3,345,176
PHOTOGRAPHIC PRODUCTS AND PROCESS
Herman E. Erikson, Winchester, and Herbert J. Frede, Framingham, Mass., assignors to Polaroid Corporation, Cambridge, Mass., a corporation of Delaware
No Drawing. Filed Oct. 18, 1966, Ser. No. 587,397
4 Claims. (Cl. 96—79)

This application is a continuation-in-part of U.S. application Ser. No. 217,268, filed Aug. 16, 1962, now abandoned.

It is one object of the present invention to provide a novel method for preparing prescreened, half-tone photographic film.

Another object of this invention is to provide a novel method for preparing prescreened, half-tone photographic film, in which non-visible actinic radiation is employed to effect the prescreening.

A further object of the present invention is to provide a novel method for preparing prescreened photographic film utilizing novel screening means and suitable for the direct recording of half-tone images in which cumbersome and expensive steps, which heretofore required dark room facilities, may be replaced by equivalent steps capable of being performed in a fully lit room.

Yet another object of the present invention is to provide a prescreened negative particularly useful for preparing a half-tone positive image by diffusion transfer processes.

Other objects of this invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The use of the half-tone image is the basis on which the modern printing of tones or shades of grey is predicated. The two most commonly employed techniques used in creating half-tone images are the photographing of a full-tone image through a screen member having a plurality of apertures, onto a photographic film; and the photographing of a full-tone image onto a prescreened photosensitive film, that is, a film which has had a half-tone screen effect pre-exposed thereon. While a number of distinct advantages exist in the use of prescreened photographic film, the known methods of preparing such film require elaborate dark room facilities and involve shelf-like problems, pre-exposure variations, latent image fading and other related problems.

The present invention obviates the aforementioned difficulties by providing a novel method for preparing prescreened, half-tone photographic film in which a screening means having first areas which are opaque to, and which will preclude the transmission of radiation, at least at the particular intensity employed, second areas which are transparent to the radiation, at least at the said intensity, and third areas which are partially transparent to the radiation, at least at the said intensity, is interposed between a source of non-visible actinic radiation, e.g., X-rays, and a film which is photosensitive to the radiation.

The screening means of this invention comprises a plurality of small macroscopic spheroid members, preferably spherical in configuration; the spheres comprising the screening means may be characterized as being substantially opaque to the particular radiation at the intensity employed through their respective diameters. These small spheroid members are placed in side-by-side and preferably close-packed relationship in a common plane so that maximum radiation is transmitted only through the interstices between and around these members, no radiation is transmitted through the diameters of these members, and the amount of radiation transmitted through these members between their respective interstices and diameters increases as a function of the decreasing thickness of these members, i.e., as a function of the distance from the respective diameters of these members. The composition of the spheroid members is not critical other than it be capable of blocking the particular radiation employed; the screen may, for example, consist of a plurality of non-homogeneous members being approximately spheroidal in shape, provided that each of the screening members is opaque to the specific nature and intensity of radiation in the region of its diameter. In a preferred embodiment, the plurality of members are spheres of glass or of a suitable metal opaque to the radiation empolyed, e.g., lead. Where found desirable or expedient to do so, the interstices between these members may be filled with a suitable binder which will confine the members in a suitable predetermined geometric pattern, but which will transmit the radiation.

In order to prepare a prescreened negative in accordance with the practice of this invention, screens of the foregoing nature are positioned at some point between the negative and the source of non-visible actinic radiation, e.g., X-rays. Preferably, the screen is placed in close proximity or contiguous with the film to be screened. It will be apparent that radiation from the source is transmitted selectively only through certain areas of the screen and the negative is pre-exposed only in terms of the areas of the screen which transmit the radiation.

It will therefore be appreciated that the novel prescreening method of this invention obviates the need for darkroom facilities, since it is possible to expose a film which is protected from visible light by a cover material which is opaque to visible light but which is transparent to the non-visible actinic radiation employed. For example, where photographic film of the type normally used for half-tone work is packed as separate flat sheets in a lighttight outer container, it would be possible, according to the present invention, to place a screen of the character heretofore described over the container and activate an X-ray source to pre-expose selectively a number of sheets while they are passing through normal packing operations in a fully lit room.

Another advantage in the use of non-visible actinic radiation is the minimal reflection and resulting distortion caused thereby. Visible light can usually be effectively used only on photographic film which has a special backing to cut down reflection, called an antihalo-backing, but by using non-visible actinic radiation it is possible to prescreen film which has no such backing and to obtain sharper definition on those films which do have a special backing, since there is little or no distortion due to reflection.

A further advantage, which is obtained in the use of non-visible actinic radiation, is the ability to create a half-tone "dot" which is unexposed at its center, and which has a gradually increasing exposure near the edges. This can be accomplished by using a screen of the aforementioned type comprising a plurality of homogeneous members in the shape of spheres, and selecting a radiation intensity which is too great to be completely absorbed by the edges of such a sphere but which is not of sufficient intensity to pass through the diameter region of the sphere. It will be obvious that nature and intensity of the non-visible actinic radiation should be selected with due regard to the particular photosensitivity of the negative employed, and also, with regard to the chemical composition and relative radio-opacity of the macroscopic spheres which comprise the screening means. In general, the negative may comprise any of the various commercially available photosensitive elements, such as gelatin emulsions comprising silver chloride, silver chlorobromide, silver bromide, silver chlorobromoiodide, silver bromoiodide, silver chloroiodide, silver iodide, and the like, all of which are sensitive to non-visible actinic radiation such as X-rays. Where the macroscopic spheres are of a material that is relatively radio-opaque, it will be obvious that radiation of a higher intensiity may be used to pre-screen negatives than that which would be employed in cases where the screen comprises glass spheres; while virtually all forms of glass absorb non-visible actinic radiation to some extent as is well known, the capacity of such materials for blocking radiation such as X-rays is considerably lower than lead, for example. The word spheres should be understood to include other like shapes such as ellipsoids, etc. The use of X-rays and the like has the further advantage of allowing better control of intensity and exposure.

In actual practice of this invention where it is desired to pre-screen a given type of photo-sensitive negative by exposure to non-visible actinic radiation through a screening means comprising macroscopic close-packed spheroid members, a test should be performed in order to determine the optimum intensity and duration of photoexposure required to provide half-tone dots of the desired quality. In general, the sensitivity of the particular negative employed, i.e., the minimum intensity and duration of exposure required to produce a latent image, will be known to the practitioner of this invention prior to the pre-screening step. Using this (or higher) intensity, and this (or longer) exposure, a sample negative is exposed through the screening means, after which it is developed by processes and with developing agents appropriate to the particular photosensitive emulsion composition. Upon examination, a half-tone pattern of dots should be clearly visible on the developed element; should the pattern be undesirably faint, the test should be repeated, using an exposure of somewhat higher intensity and/or longer duration, until a satisfactory half-tone pattern is achieved.

It will be obvious that a necessary characteristic of the macroscopic spheroids employed as the screening means in the practice of this invention is that they be opaque in the regions of their respective diameters to the non-visible actinic radiation employed, at least at the minimum exposure and intensity referred to above. This may be achieved by varying the diameters of the spheroids, or alternatively, by selecting spheroids of appropriate chemical composition. Thus, for example, where the particular negative employed has a relatively high A.S.A. speed and is hence photoexposable by non-visible actinic radiation of relatively low intensity and short duration, ordinary macroscopic glass beads have been found to provide a highly satisfactory screening means; if the negative is such that a relatively high intensity exposure is required, spheroids of a more radio-opaque material, such as lead, should be used.

It will also be obvious that the size of the spheroid members which comprise the screening means is largely a matter of choice, and will depend in part upon the ultimate number of half-tone dots desired in a given area of negative, and in part upon the radio-opacity of the material from which it is made. For example, spheroids having a mean diameter of anywhere from .0005 inch to .01 inch may be used to provide screening means which would result in pre-screened negatives of the sort which are of general commercial interest; obviously, if negatives containing a greater number of dots per unit area are desired, smaller spheroid members may be employed, while if a fewer number of dots per unit area will suffice, the spheroids may be larger.

The present invention is particularly useful in preparing pre-screened negatives to be employed in photographic processes for obtaining half-tone images by diffusion transfer, e.g., processes wherein a processing solution comprising an aqueous alkaline solution of a silver halide developing agent and a silver halide solvent is spread uniformly between an exposed silver halide stratum and a superposed image-receiving layer to form, by imbibition, a transfer image on the image-receiving layer. Thus, for example, pre-screened negatives prepared in accordance with this invention are particularly useful in film assemblies adaptable for use in self-developing cameras to obtain a positive screened image in a manner of seconds, e.g., assemblies comprising a stratum containing a light-sensitive silver halide emulsion, an image-receiving element having a silver receptive stratum and a frangible container confining the processing solution. Processes and products of the foregoing description are described, for example, in U.S. Patent No. 2,543,181, issued to Edwin H. Land.

The following nonlimiting examples will illustrate the practice of this invention:

*Example I*

A screen suitable for use in this invention was prepared employing a plurality of glass spheres having a diameter of 0.005 inch, as the small screen members; the glass spheres employed were of the type used for reflectorized surfaces, made of crown barium type glass, commercially available from Ballotini Division, Potter Brothers, Inc., Carlstadt, New Jersey 07070. The glass spheres were arranged side by side in a common plane on a strip of pressure-sensitive cellophane tape.

To prepare suitable screens such as that illustrated in Example I, the macroscopic screen members may be glass or metal or any other material which is opaque to the specific intensity of radiation employed. It should also be noted that they may have a spherical, cylindrical, or elliptical shape without changing the effective result necessary to practice this invention.

As previously noted, it is not necessary to bind the screen members together but, where found desirable or expedient to do so, the small screen members may be bound together by any means which will transmit radiation from the desired source as, for example, pressure-sensitive tape, glass, a plastic binder such as polyvinyl chloride or polyethylene, or even an adhesive coating which will adhere to the particular material selected for use as a screen.

*Example II*

A prescreened half-tone negative was prepared utilizing the screening means described in Example I. A diffusion transfer photographic unit comprising a gelatin silver halide emulsion having an A.S.A. equivalent speed of 3000, a superposed image-receiving element, and a frangible container containing a viscous aqueous akaline processing solution, commercially available as Type 57 Polaroid Land Picture Roll, was placed at a target-to-film distance of 12.5 inches from a Beryllium Window X-ray Tube set at 14 kv. and 10 milliamps. The screen was interposed between the photographic unit and the X-ray tube, being positioned contiguous with the photographic unit to avoid distortion. Exposure was for two seconds to prepare the presecreened half-tone negative. The photosensitive element so exposed was developed by passing the photographic unit between a pair of pressure-applying rollers, thereby rupturing the frangible container and spreading the processing solution in a uniform layer between the photosensitive element and the image-receiving element. After a period of 10 seconds, the photosensitive element and image-receiving element were stripped apart; the image-receiving element revealed a half-tone dot pattern.

If desired, it would also be possible to prepare pre-screened half-tone negatives by pre-exposing a photographic film to visible light, through a screen similar to that described in Example I, using otherwise conventional procedures and precautions. A pre-exposure made in this way will give true dots, the size of which can be controlled within much finer limits than was heretofore possible with conventional screens, by careful sieve sifting for example.

The prescreened negatives prepared in the manner illustrated in Example II have excellent shelf-life properties. Such negatives, which had been exposed to X-ray radiation and developed over a year after exposure, have been found to show no sign of latent image fading.

It will be apparent to those skilled in the art that, in images prepared by diffusion transfer, the half-tone image will exhibit the shape and geometric configuration of the opaque areas of the screening means, as distinguished from screened negatives prepared by other conventional processes wherein a latent image is recorded in terms of the transparent areas of the screening means. Thus, the screening means of this invention enables one to obtain a positive transfer image having a half-tone image containing a greater mass or concentration of "dots" per unit area than would ordinarily be obtainable from conventional screening means.

While Example II relates to the formation of prescreened light-sensitive silver halide emulsions, it is to be expressly understood that the invention is not limited thereto. It will be apparent that the invention is equally adaptable to prescreening other light-sensitive materials heretofore known in the art, i.e., diazonium compounds, ferric salts, etc. It will likewise be apparent that the invention is not restricted to black-and-white photographic processes, but may be used in the preparation of monochromatic or multicolor images.

Since certain changes may be made in the above product and process without departing from the scope of the invention herein involved, it is intended that all matter contained in the above description shall be interpreted as illustrative and not in a limiting sense.

What is claimed is:

1. A process comprising preparing a prescreened photosensitive element by exposing a photosensitive element to X-ray radiation to which said photosensitive element is sensitive, said exposure being of a predetermined intensity and being effected through a half-tone screening means comprising macroscopic close-packed solid spheroid members, said screening means being substantially opaque to said radiation in the regions of the diameters of said spheroid members, substantially transparent to said radiation in the regions of the interstices between said spheroid members, and the remaining areas of said screening means being capable of transmitting said radiation in amounts which increase as a function of the decrease in thickness of said spheroid members, whereby a latent image is formed on said photosensitive element, said latent image when developed having a maximum density in areas exposed through said interstices between said spheroid members of said screening means, minimum intensity in areas exposed through said diameters of said spheroid members of said screening means, and intermediate density in areas exposed through the remaining portions of said screening means, said intermediate density increasing as a function of the decrease in thickness of those portions of said screening means through which it is exposed.

2. The process as described in claim 1 wherein said macroscopic solid spheroid members are glass spheres.

3. The process as described in claim 1 wherein said macroscopic solid spheroid members are lead spheres.

4. The process as described in claim 1 wherein said photosensitive element comprises a gelatino silver halide emulsion.

References Cited

UNITED STATES PATENTS

| | | | |
|---|---|---|---|
| 2,522,522 | 9/1950 | Krosnow | 250—63 |
| 2,566,265 | 8/1951 | Tuttle | 96—116 X |
| 2,691,586 | 10/1954 | Yule et al. | 96—45 |
| 2,701,199 | 2/1955 | Damschroder et al. | 96—45 |
| 2,987,397 | 6/1961 | Maurer | 96—79 |

NORMAN G. TORCHIN, Primary Examiner.

R. H. SMITH, Examiner.